US012779561B2

(12) United States Patent
Riggenmann et al.

(10) Patent No.: US 12,779,561 B2
(45) Date of Patent: Nov. 3, 2026

(54) HAND-HELD CIRCULAR SAW COMPRISING A HANDING DEVICE

(71) Applicant: Robert Bosch GmbH, Stuttgart (DE)

(72) Inventors: Simon Riggenmann, Stuttgart (DE); Gopinath Alagesan, Coimbatore (IN); William J. Shiel, Bartlett, IL (US)

(73) Assignee: Robert Bosch GmbH, Stuttgart (DE)

( * ) Notice: Subject to any disclaimer, the term of this patent is extended or adjusted under 35 U.S.C. 154(b) by 115 days.

(21) Appl. No.: 18/830,866

(22) Filed: Sep. 11, 2024

(65) Prior Publication Data

US 2025/0091143 A1 Mar. 20, 2025

(30) Foreign Application Priority Data

Sep. 15, 2023 (DE) ..................... 10 2023 208 981.5

(51) Int. Cl.
*B23D 47/06* (2006.01)
*B23D 45/16* (2006.01)

(52) U.S. Cl.
CPC ............. *B23D 47/06* (2013.01); *B23D 45/16* (2013.01)

(58) Field of Classification Search
None
See application file for complete search history.

(56) References Cited

U.S. PATENT DOCUMENTS 7,306,052 B2 * 12/2007 Vahabi-Nejad ........... B25C 7/00 173/217
10,286,539 B2 5/2019 Francis et al.
2015/0266201 A1 9/2015 Nakashima
2021/0001418 A1 * 1/2021 Nakashima ............... B25F 5/02
2024/0058938 A1 * 2/2024 Gong ........................ B25F 5/02
2024/0359244 A1 * 10/2024 Imayoshi ............... B23D 45/16
2025/0091143 A1 * 3/2025 Riggenmann .......... B23D 47/06

FOREIGN PATENT DOCUMENTS

| | | | | | |
|---|---|---|---|---|---|
| CN | 108340015 | A | | 7/2018 | |
| CN | 120755417 | A | * | 10/2025 | ................ B25F 5/00 |
| DE | 102 09 096 | A1 | | 9/2002 | |
| DE | 20 2015 002 087 | U1 | | 5/2015 | |
| EP | 3 030 390 | B1 | | 10/2018 | |
| JP | 4672438 | B2 | * | 4/2011 | |

OTHER PUBLICATIONS

ENglish translation of CN-108340015-A, dated Jul. 31, 2018.*
English translation of CN-120755417-A, dated Oct. 10, 2025.*

* cited by examiner

*Primary Examiner* — Hwei-Siu C Payer
(74) *Attorney, Agent, or Firm* — Maginot, Moore & Beck LLP

(57) ABSTRACT

A hand-held circular saw includes a housing in which a drive motor for rotatably driving a circular saw blade is disposed, and also includes a handle which is disposed on the housing and on which a hanging device having a rotation axis portion and a hook element is disposed. The hook element is disposed perpendicular to the rotation axis portion. The rotation axis portion forms an axis of rotation and is rotatably mounted on the housing. The hook element can pivot about the axis of rotation in an associated plane. The associated plane is aligned parallel to a center of gravity plane of the hand-held circular saw.

20 Claims, 11 Drawing Sheets

HAND-HELD CIRCULAR SAW COMPRISING A HANGING DEVICE

This application claims priority under 35 U.S.C. § 119 to patent application no. DE 10 2023 208 981.5, filed on Sep. 15, 2023 in Germany, the disclosure of which is incorporated herein by reference in its entirety.

BACKGROUND

The present disclosure relates to a hand-held circular saw comprising a housing in which a drive motor for rotatably driving a circular saw blade is disposed, and comprising a handle which is disposed on the housing and on which a hanging device comprising a rotation axis portion and a hook element is disposed, wherein the hook element is disposed perpendicular to the rotation axis portion and wherein the rotation axis portion forms an axis of rotation and is rotatably mounted on the housing.

Such a hand-held circular saw is known from the prior art. The hand-held circular saw comprises a housing in which a drive motor for rotatably driving a circular saw blade is disposed. A handle, which is disposed on the housing and on which a hanging device comprising a rotation axis portion and a hook element is disposed, is provided as well. The hook element is disposed perpendicular to the rotation axis portion and the rotation axis portion forms an axis of rotation and is rotatably mounted on the housing.

SUMMARY

The disclosure relates to a hand-held circular saw comprising a housing in which a drive motor for rotatably driving a circular saw blade is disposed, and comprising a handle which is disposed on the housing and on which a hanging device comprising a rotation axis portion and a hook element is disposed, wherein the hook element is disposed perpendicular to the rotation axis portion and wherein the rotation axis portion forms an axis of rotation and is rotatably mounted on the housing. The hook element can pivot about the axis of rotation in an associated plane and the associated plane aligned parallel to a center of gravity plane of the hand-held circular saw.

The disclosure thus makes it possible to provide a hand-held circular saw in which the arrangement of the associated plane parallel to the center of gravity plane makes it possible to hang the hand-held circular saw in a safe and stable manner, so that unintentional dropping of the hand-held circular saw can be efficiently prevented.

There is a preferably a space between the associated plane and the center of gravity plane and the space is at most 40 mm.

This makes it possible to hang the hand-held circular saw in a robust and reliable manner.

The rotation axis portion is preferably disposed parallel to an axis of rotation of the circular saw blade.

A suitable arrangement of the axis of rotation can thus be made possible in a simple manner.

The hook element can preferably be rotated on the handle by a predetermined rotation angle, wherein the predetermined rotation angle ranges from 90° to 210°.

This makes it easy and uncomplicated to align the hand-held circular saw using the hook element, and unintentional dropping can be efficiently prevented.

According to one embodiment, the hook element is U-shaped or L-shaped.

A hook element for placement on a round or square holding element can thus be provided in a simple manner.

The rotation axis portion is preferably associated with a bushing which is configured to lock the rotation axis portion at least in an associated locking position.

A secure and robust arrangement of the rotation axis portion can thus be made possible.

Preferably, a pin for axially securing the rotation axis portion on the handle is provided, wherein the pin is connected to the rotation axis portion in a rotationally fixed manner.

A stable and reliable fastening of the rotation axis portion on the handle can thus be made possible.

On its end face facing the pin, the bushing preferably comprises at least one recess in which the pin is disposed in the locking position.

A simple and secure locking can thus be made possible.

The hanging device is preferably disposed on a side of the handle facing the circular saw blade or on a side of the handle facing away from the circular saw blade.

A suitable arrangement of the hanging device can thus be made possible in a simple manner.

The housing preferably comprises a receptacle for receiving the hook element in a resting position.

Safe and reliable operation of the hand-held circular saw can thus be made possible.

According to one embodiment, the hook element is associated with an operating element for pivoting from the resting position into a locking position.

It is thus possible for a user of the hand-held circular saw to pivot the operating element in a comfortable manner.

BRIEF DESCRIPTION OF THE DRAWINGS

The disclosure is explained in more detail in the following description with reference to the embodiment examples shown in the drawings. The figures show.

DETAILED DESCRIPTION

Elements having the same or a comparable function are provided with the same reference signs in the figures and are described in detail only once.

Figure 1:
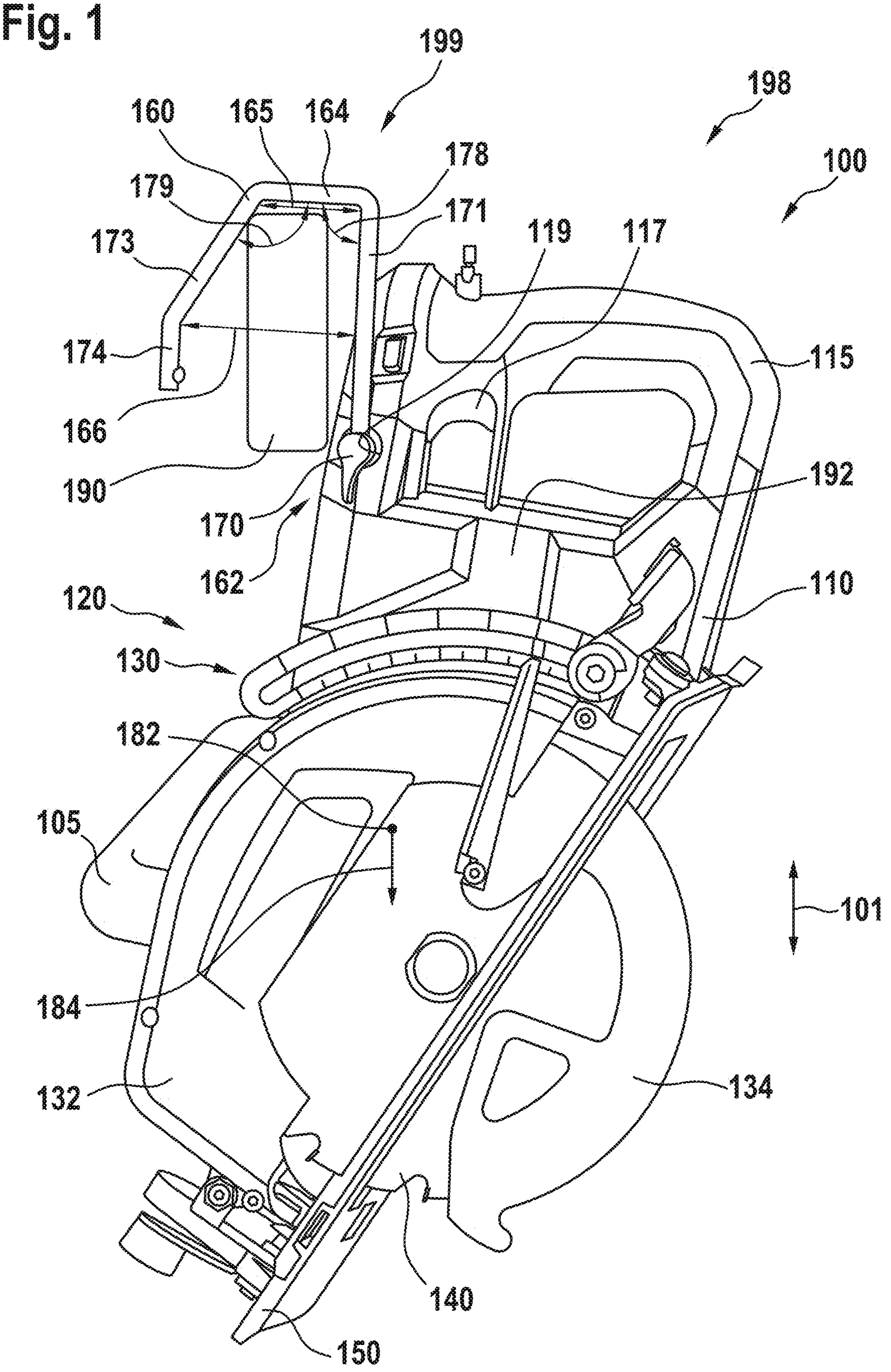
FIG. 1 a side view of a hand-held circular saw comprising a hanging device in a locking position, FIG. 2 a plan view onto the hand-held circular saw of FIG. 1 with the hanging device in a resting position, FIG. 3 a view of the hand-held circular saw of FIG. 1 and FIG. 2 viewed in the direction of an arrow 198 of FIG. 1, FIG. 4 a side view of the hand-held circular saw of FIG. 1 to FIG. 3 with the hanging device in the resting position and the locking position, FIG. 5 an enlarged section of the hand-held circular saw of FIG. 1 to FIG. 4 with the hanging device in the resting position, FIG. 6 an enlarged section of the hand-held circular saw of FIG. 1 to FIG. 5 without the hanging device of FIG. 1 to FIG. 5, FIG. 7 an enlarged section of the hand-held circular saw of FIG. 1 to FIG. 5 with the hanging device of FIG. 1 to FIG. 5, FIG. 8 a perspective view of the hand-held circular saw of FIG. 1 to FIG. 7, FIG. 9 a perspective view of a hook element associated with the hanging device of FIG. 1 to FIG. 8, FIG. 10 a perspective view of an alternative hook element of the hanging device of FIG. 1 to FIG. 8, FIG. 11 a perspective view of another hook element of the hanging device of FIG. 1 to FIG. 8, FIG. 12 a sectional view through a handle associated with the hand-held circular saw to illustrate an arrangement of a rotation axis portion associated with the hanging device of FIG. 1 to FIG. 8, FIG. 13 a perspective view of the rotation axis portion of FIG. 12, FIG. 14 an enlarged view of a bushing associated with the rotation axis portion of FIG. 12 and FIG. 13, FIG. 15 a side view of the bushing of FIG. 14 disposed on the rotation axis portion, FIG. 16 a plan view onto the rotation axis portion of FIG. 12 to FIG. 15 secured in the handle of the hand-held circular saw of FIG. 1 to FIG. 8, and FIG. 17 a plan view onto a housing half-shell of the handle of the hand-held circular saw of FIG. 1 to FIG. 8 with an alternative pretensioning of the rotation axis portion.

FIG. 1 shows an example of a hand-held circular saw 100 comprising a housing 110 in which a drive motor 120 for rotatably driving a circular saw blade 140 is disposed. The housing 110 is preferably associated with a handle 115. An operating element 117 for activating the drive motor 120 of the hand-held circular saw 100 is preferably disposed on the handle 115. The housing 110 is optionally associated with an auxiliary handle 105 for two-handed operation of the hand-held circular saw 100.

According to one embodiment, the hand-held circular saw 100 comprises a battery pack for mains-independent power supply. The hand-held circular saw 100 can alternatively also comprise a power cable for mains-dependent power supply. The hand-held circular saw 100 preferably furthermore comprises a base plate 150. During a processing operation, the base plate 150 preferably rests on a workpiece to be processed. The hand-held circular saw 100 additionally comprises a depth adjustment device 130 for setting a cutting depth of the circular saw blade 140 in a workpiece to be processed. The depth adjustment device 130 is preferably disposed in the area of the handle 115 of the hand-held circular saw 100. The circular saw blade 140 is furthermore associated with an illustrative upper protective hood 132 and a lower protective hood 134.

According to the disclosure, a hanging device 199 is disposed on the housing 110. The hanging device 199 comprises a rotation axis portion 162 and a hook element 160. The hook element 160 is preferably disposed perpendicular to the rotation axis portion 162. The rotation axis portion 162 preferably forms an axis of rotation (203 in FIG. 2) and is rotatably mounted on the housing 110. The rotation axis portion 162 is preferably rotatably mounted on the handle 115.

The hanging device 199 is preferably configured such that the hand-held circular saw 100 can be hung up on a holding element 190, e.g. a wooden beam or a rod, in which case the handle 115 illustratively points upward. This makes it easy for a user of the hand-held circular saw 100 to remove it from the hanging position. For this reason, the hanging device 199 is preferably disposed in the longitudinal direction 101 of FIG. 1 in the area of a center of gravity 182 of the hand-held circular saw 100 on which the weight force of the hand-held circular saw 100 acts, which is shown by an arrow 184.

According to one embodiment, the hook element 160 is U-shaped. In this case, the hook element 160 comprises a first portion 171 which is connected to the rotation axis portion 162. The rotation axis portion 162 is preferably disposed in the housing 110 in a recess 119.

The first portion 171 is illustratively disposed at an angle 178 to a second portion 164. The angle 178 is preferably 90°. The second portion 164 is illustratively disposed at an angle 179 to a third portion 173. The angle 179 is preferably at least 90° and is preferably less than or equal to 180°. The angle 179 is illustratively 120°. The third portion 173 is illustratively associated with a fourth portion 174. The fourth portion 174 is preferably disposed parallel to the first portion 171. A space 166 is created here between the first and fourth portion 171, 174. The second portion 164 furthermore illustratively has a length 165. The length 165 is preferably smaller than the space 166.

Figure 3:
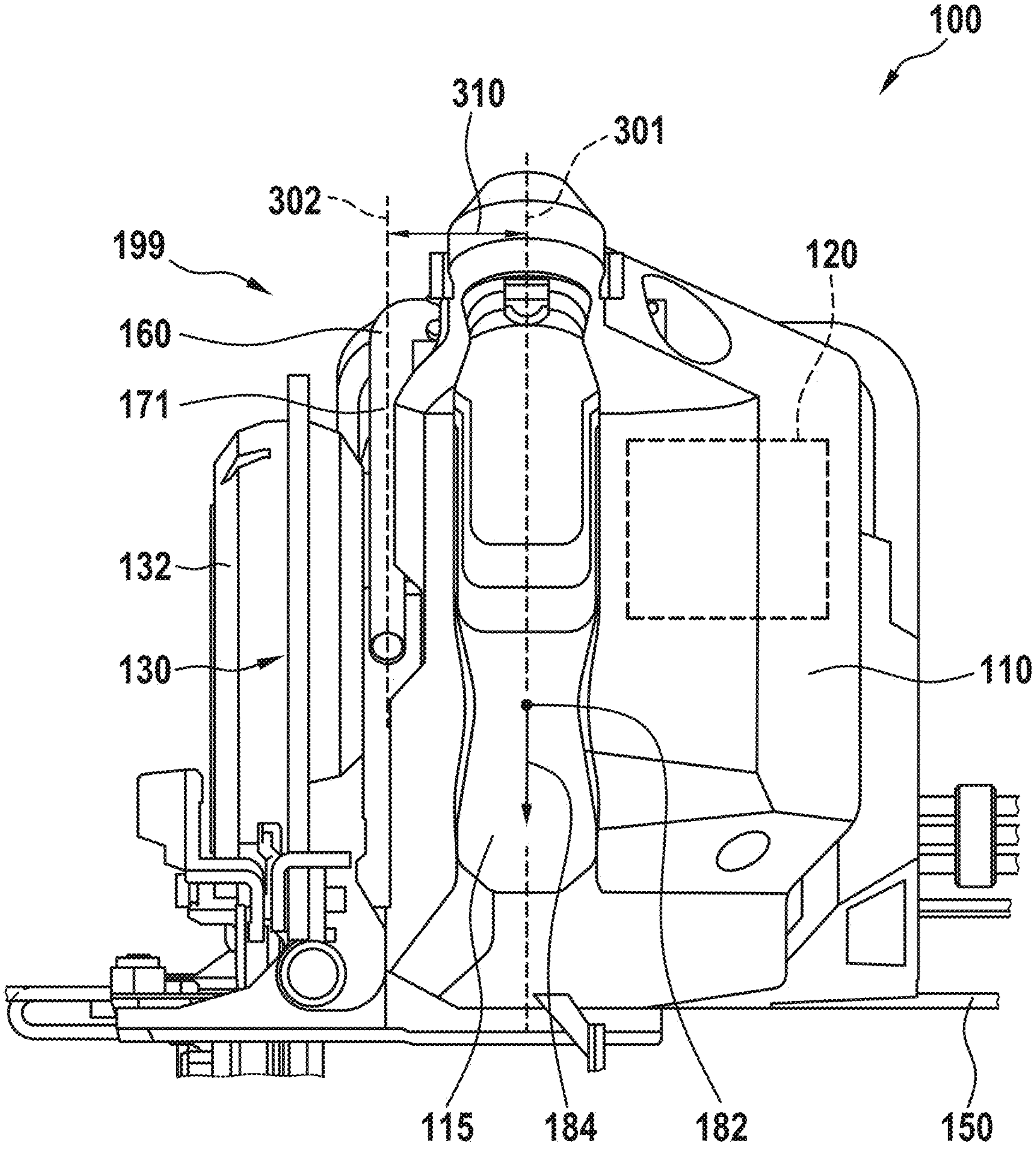
Figure 4:
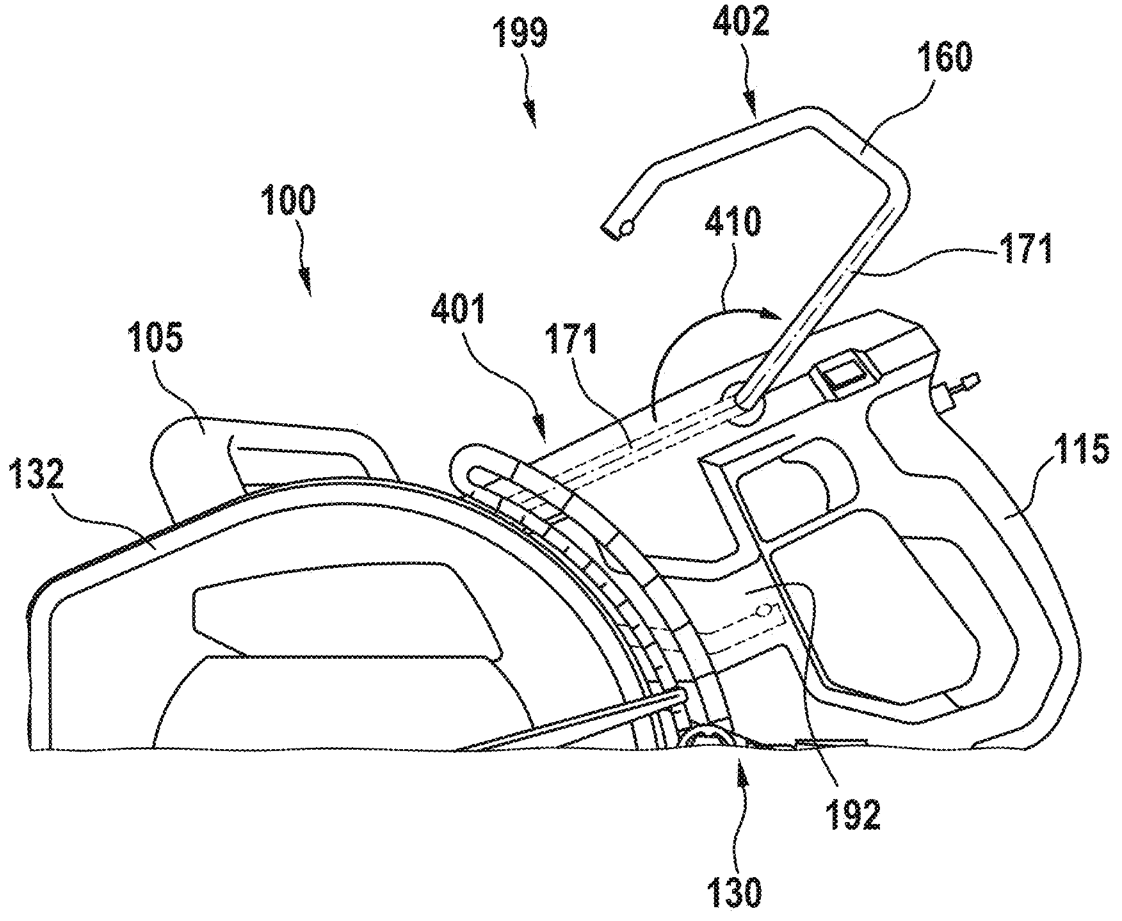

The hanging device 199, in particular the hook element 160, is preferably associated with an operating element 170 for pivoting from a resting position (401 in FIG. 4) to a locking position (402 in FIG. 4). The housing 110 also comprises a receptacle 192 for receiving the hook element 160 in the resting position (401 in FIG. 4). The operating element 170 is preferably disposed in the area of the operating element 117 for activating the drive motor 120. The operating element 170 is preferably disposed on the hook element 160 by way of overmolding. FIG. 1 furthermore shows an arrow 198, which specifies a viewing direction for FIG. 3.

Figure 2:
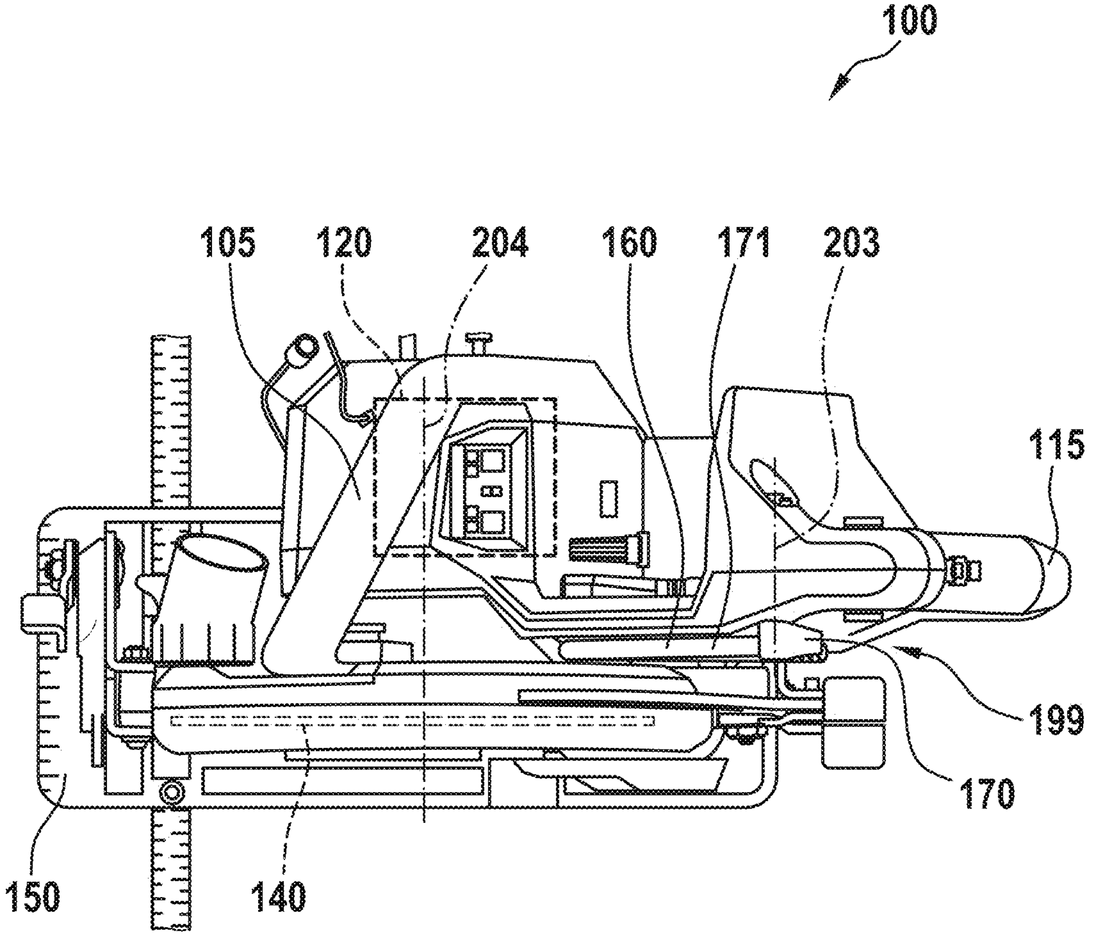

FIG. 2 shows the hand-held circular saw 100 with the hanging device 199 of FIG. 1 viewed from above. FIG. 2 illustrates an axis of rotation 204 of the circular saw blade 140 and an axis of rotation 203 associated with the hook element 160 or the rotation axis portion 162 of FIG. 1. The circular saw blade 140 is shown merely schematically in FIG. 2 with a line. The axis of rotation 203 of the rotation axis portion 162 is preferably disposed parallel to the axis of rotation 204 of the circular saw blade.

FIG. 3 shows the hand-held circular saw 100 with the hanging device 199 of FIG. 1 and FIG. 2, viewed in the direction of the arrow 198 of FIG. 1. The hook element 160 is preferably associated with a plane 302 and the center of gravity 182 of the hand-held circular saw 100 is associated with a center of gravity plane 301. The hook element 160 can preferably pivot in the plane 302 about the axis of rotation 203 of FIG. 2. The center of gravity plane 301 is preferably disposed in the area of the handle 115. According to the disclosure, the plane 302 of the hook element 160 is aligned parallel to the center of gravity plane 301, at least within customary manufacturing tolerances. There is a preferably a space 310 between the plane 302 and the center of gravity plane 301. The space 310 is preferably at most 40 mm.

FIG. 4 shows the hand-held circular saw 100 with the hanging device 199 of FIG. 1 to FIG. 3. The hook element 160 is preferably shown in a resting position 401 and a locking position 402. For this purpose, the hook element 160 is disposed on the handle 115 such that it can rotate by a predetermined rotation angle 410. The predetermined rotation angle 410 preferably ranges from 90° to 210°.

Figure 5:
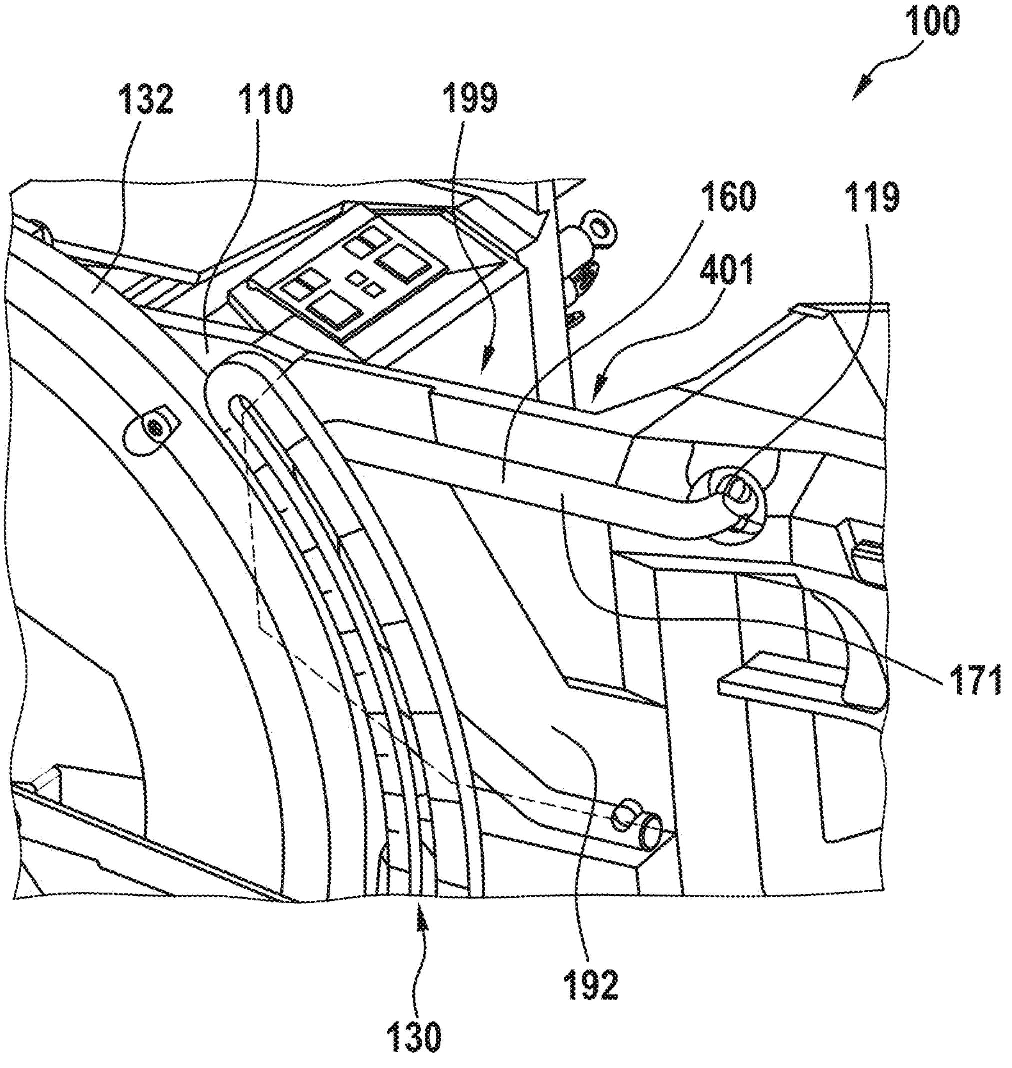

FIG. 5 shows a section of the housing 110 of the hand-held circular saw 100 with the hanging device 199 of FIG. 1 to FIG. 4, wherein the hanging device 199 is disposed in the resting position 401. In the resting position 401, the hanging device 199, in particular the hook element 160, is disposed in the receptacle 192 in the housing 110.

Figure 6:
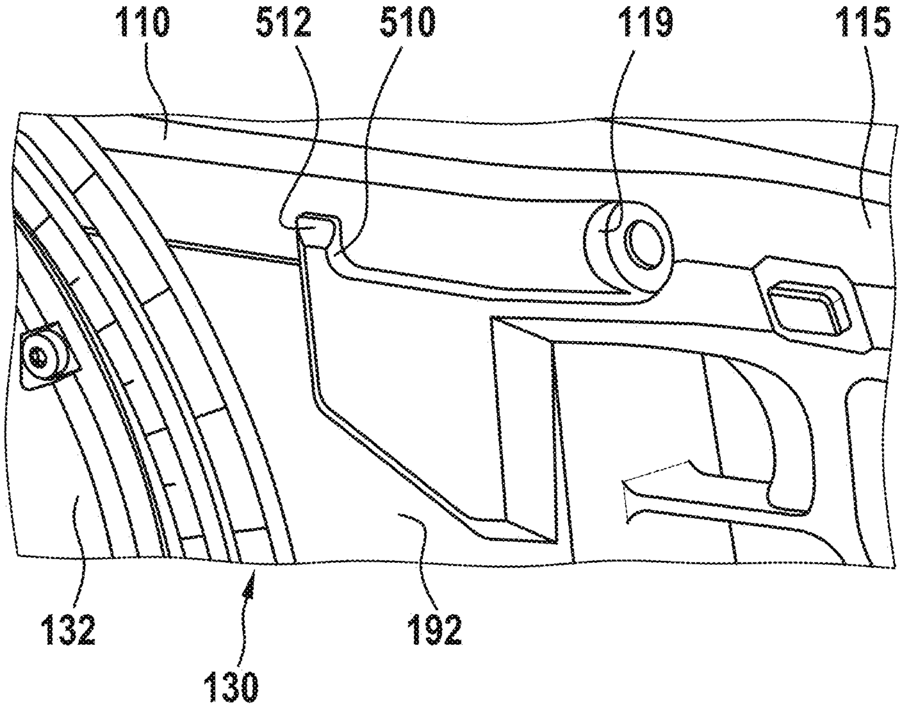

FIG. 6 shows a section of the housing 110 of the hand-held circular saw 100 of FIG. 1 to FIG. 5 without the hanging device 199 of FIG. 1 to FIG. 5. FIG. 6 illustrates the receptacle 192 for receiving the hook element 160 of the hanging device 199 of FIG. 1 to FIG. 5. The receptacle 192 comprises a positioning web 510 with a receiving surface

512 for partially receiving the first portion 171 of the hook element 160 of the hanging device 199 of FIG. 1 to FIG. 5 in the resting position 401 of FIG. 4.

Figure 7:
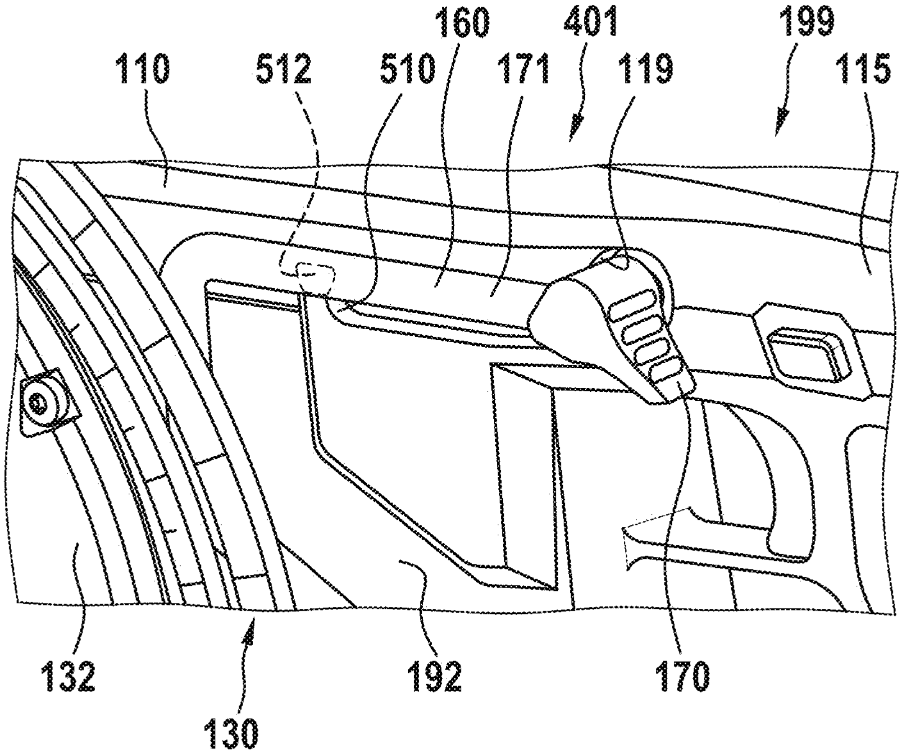

FIG. 7 shows a section of the housing 110 of the hand-held circular saw 100 with the hanging device 199 of FIG. 1 to FIG. 5. FIG. 7 shows the first portion 171 of the hook element 160 of the hanging device 199 in the resting position 401 and the first portion 171 is disposed partially in the receiving surface 512.

Figure 8:
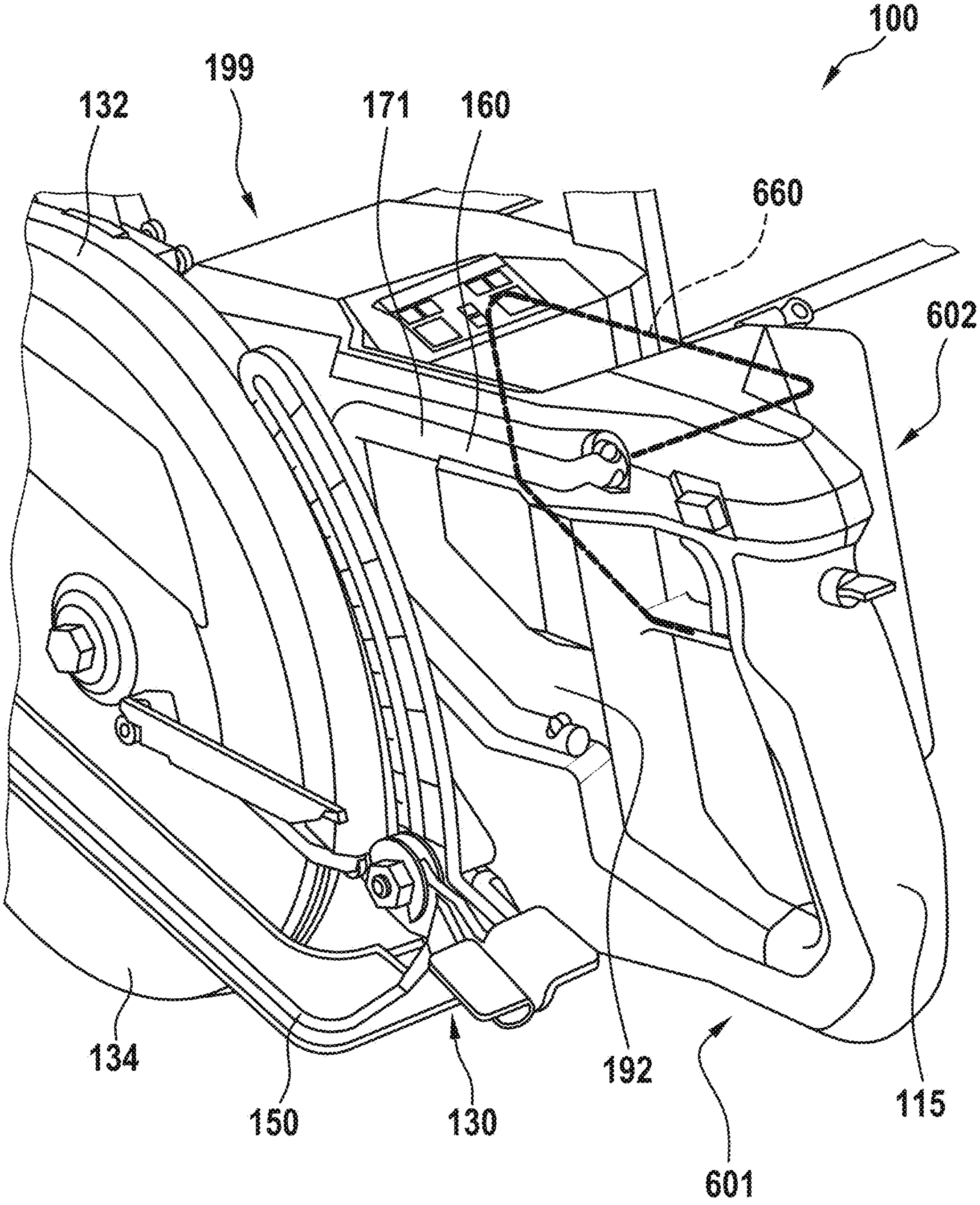

FIG. 8 shows the hand-held circular saw 100 with the hanging device 199 of FIGS. 1 to 5 and FIG. 7. The hanging device 199 is preferably disposed on a side 601 of the handle 115 facing the circular saw blade 140 of FIG. 1 or on a side 602 of the handle 115 facing away from the circular saw blade 140. In FIG. 8, the hanging device 199 is illustratively disposed on the side 601 or to the left of the handle 115. An alternative hanging device 660 is disposed in FIG. 8 on the side 602 or illustratively to the right of the handle 115.

Figure 9:
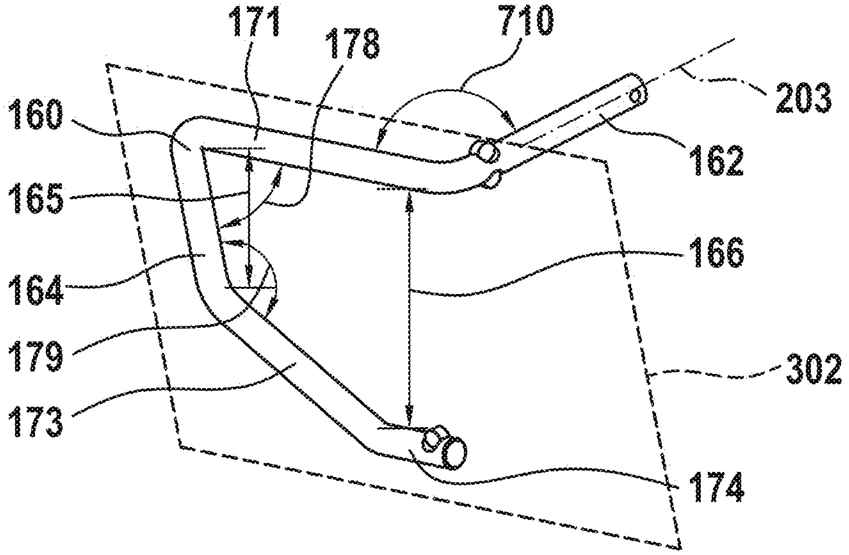

FIG. 9 shows the hook element 160 and the rotation axis portion 162 of the hanging device 199 of FIG. 1 to FIG. 5, FIG. 7, and FIG. 8 and illustrates the plane 302 associated with the hook element 160. The hook element 160 is preferably disposed at an angle 710 to the rotation axis portion 162. The angle 710 is preferably 90°. The hook element 160 and the rotation axis portion 162 are preferably formed in one piece. According to one embodiment, the hook element 160 and the rotation axis portion 162 are configured as a bent wire with a round or cuboid cross-section.

Figure 10:
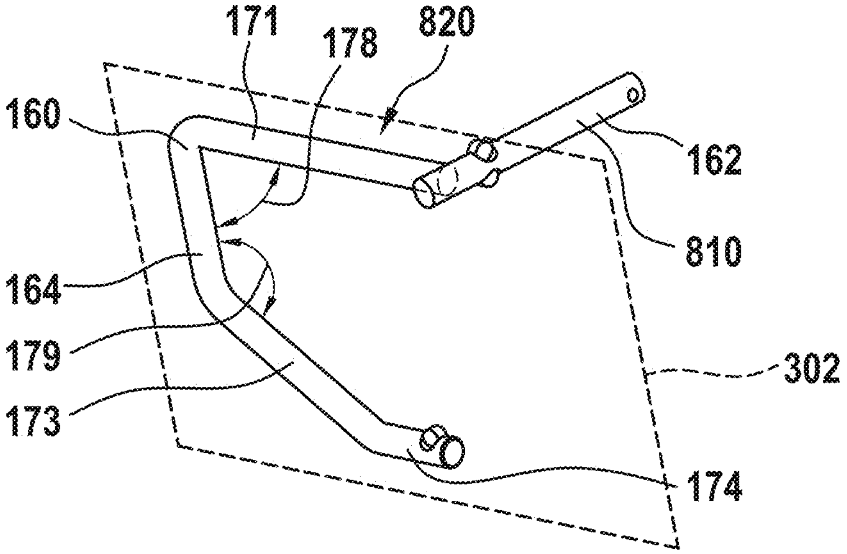

FIG. 10 shows the hook element 160 and the rotation axis portion 162 of the hanging device 199 of FIG. 1 to FIG. 5, FIG. 7 and FIG. 8 in a two-part design. The hook element 160 is configured here as the part 820 and the rotation axis portion 162 is configured as the part 810. The two parts 810, 820 are preferably connected to one another via a fixed connection, e.g. a weld connection.

Figure 11:
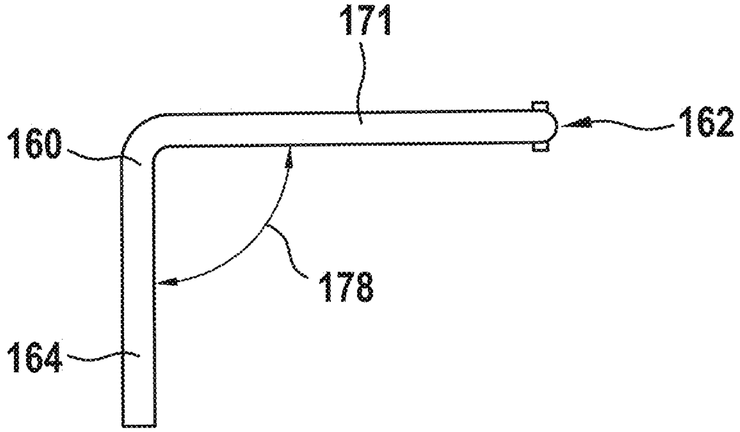

FIG. 11 shows the hook element 160 of the hanging device 199 of FIG. 1 to FIG. 5, FIG. 7, and FIG. 8, which is L-shaped according to another embodiment. As an example, the hook element 160 here comprises only the first and second portion 171, 164.

Figure 12:
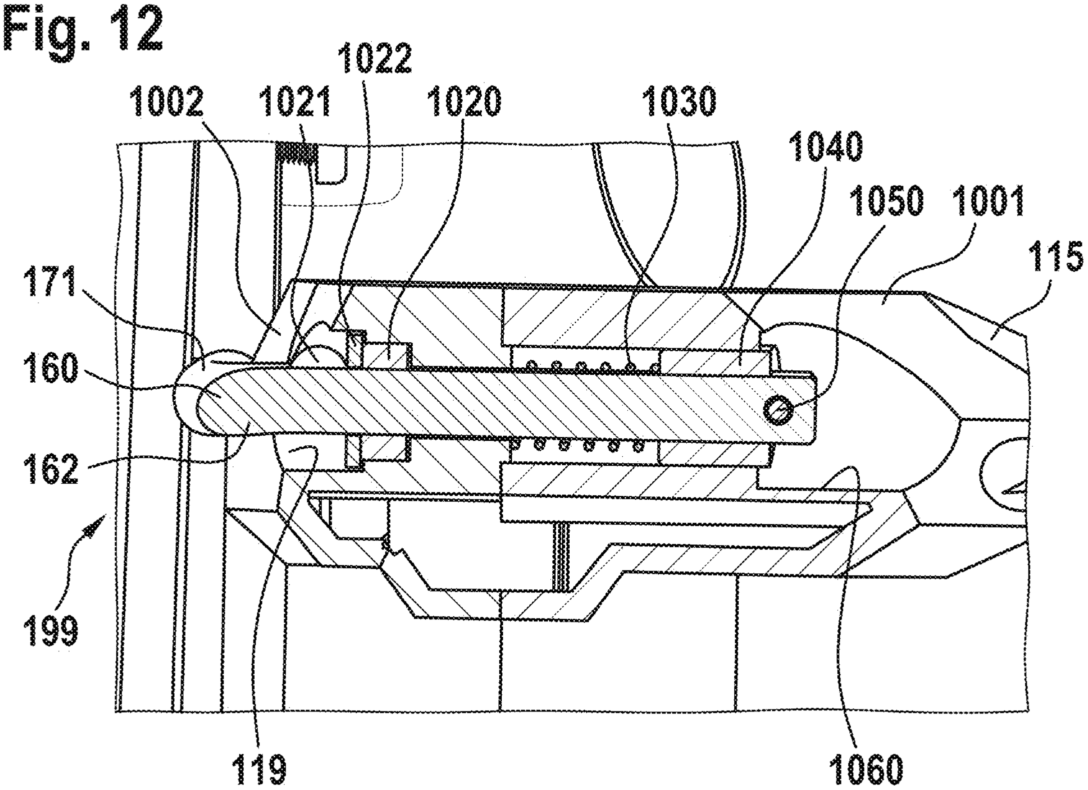

FIG. 12 shows the rotation axis portion 162 disposed in the recess 119 of the handle 115. The handle 115 preferably comprises two housing half-shells 1001, 1002. The recess 119 is illustratively configured in the left housing half-shell 1002 and a receptacle 1060 is configured in the illustrative right housing half-shell 1001. The rotation axis portion 162 is mounted in the housing half-shell 1002 via a sleeve 1020. The sleeve 1020 is associated with a disk 1022, and the rotation axis portion 162 comprises at least one loading element 1021. The at least one loading element 1021 presses the sleeve 1020 into the recess 119.

The rotation axis portion 162 is preferably associated with a bushing 1040. The bushing 1040 is configured to lock the rotation axis portion 162 at least in the associated locking position 402 of FIG. 4. A pin 1050 for axially securing the rotation axis portion 162 on the handle 115 is provided as well. The pin 1050 is preferably connected to the rotation axis portion 162 in a rotationally fixed manner. The bushing 1040 is preferably pressed against the pin 1050 by a spring element 1030. The rotation axis portion 162 is thus mounted in the housing 110 or the handle 115 and disposed such that it is axially displaceable.

Figure 13:
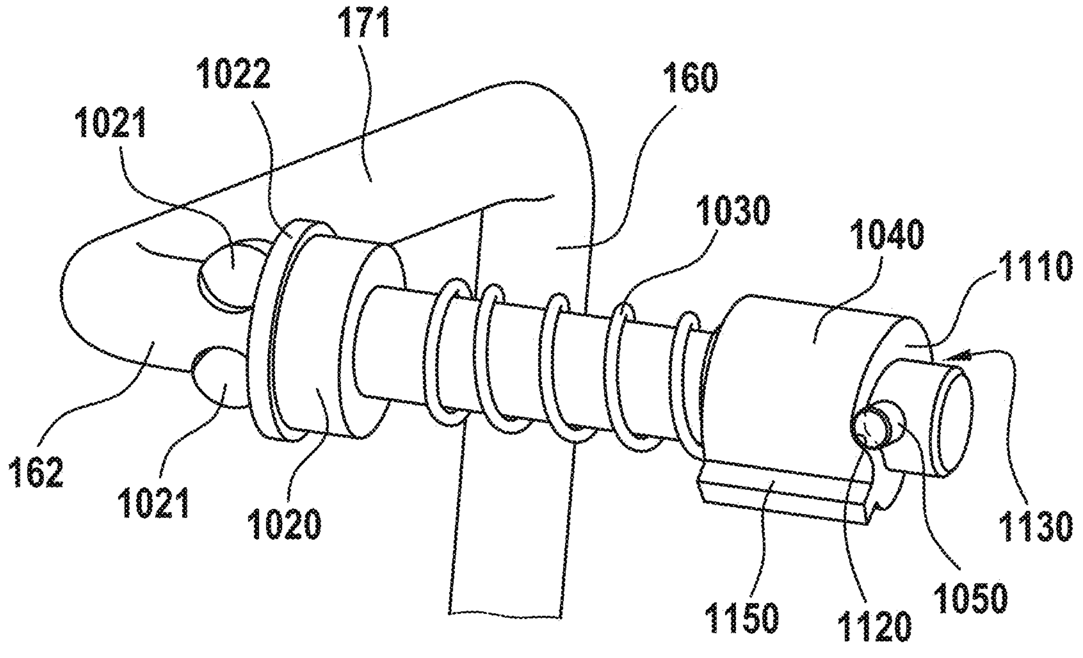

FIG. 13 shows the rotation axis portion 162 of the hanging device 199 of FIG. 1 to FIG. 5, FIG. 7 to FIG. 9 and FIG. 12 with the at least one, illustratively two loading elements 1021 of the disk 1022 and the sleeve 1020, as well as the spring element 1030, the bushing 1040 and the pin 1050. FIG. 13 illustrates the bushing 1040, which comprises at least one recess 1120, 1130 on its end face 1110 facing the pin 1050. The pin 1050 is disposed in the at least one recess 1120, 1130 in the locking position 402 of FIG. 4. Illustratively, there are two oppositely disposed recesses 1120, 1130.

The bushing 1040 also comprises at least one anti-rotation web 1150 on its outer periphery. The anti-rotation web 1150 is illustratively fixedly disposed in a groove (1602 in FIG. 16) of the housing 110 or the handle 115. When the rotation axis portion 162 is rotated, the bushing 1040 remains disposed in the groove without rotation of said bushing 1040.

Figure 14:
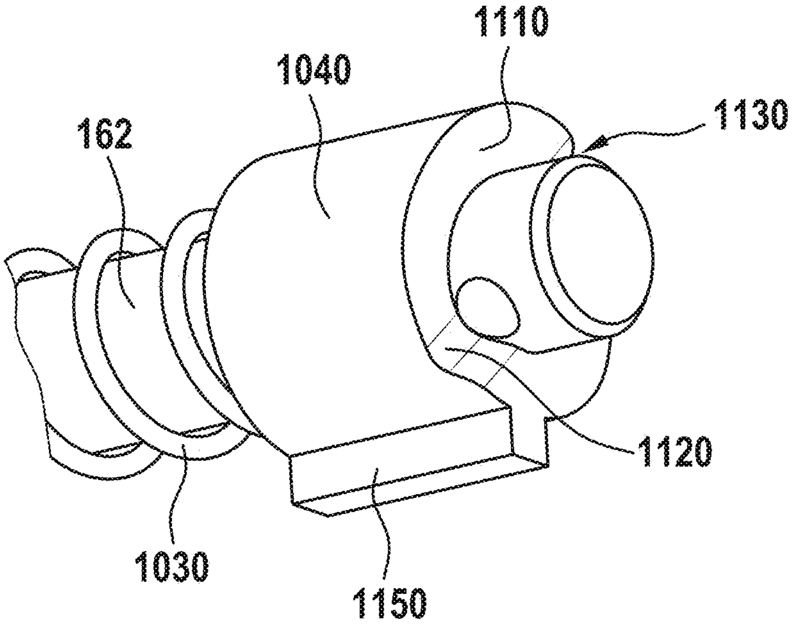

FIG. 14 shows the free end of the rotation axis portion 162 of FIG. 12 and FIG. 13 without the pin 1050 and illustrates the preferably two recesses 1120, 1130 which are configured on the end face 1110 of the bushing 1040.

Figure 15:
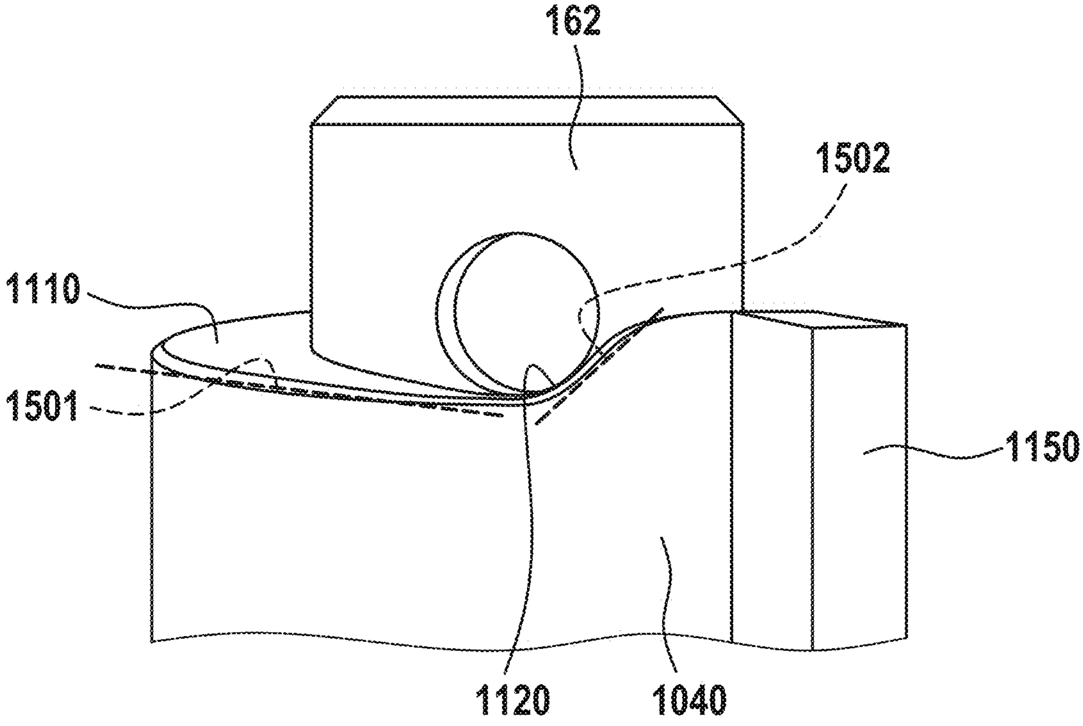

FIG. 15 shows the bushing 1040 disposed on the free end of the rotation axis portion 162 of FIG. 12 to FIG. 14 and illustrates the flanks 1501, 1502 associated with the end face 1110. An illustrative left flank 1501 is configured with a comparatively flat slope. The flank 1501 is configured to guide the pin 1050 of FIG. 12 and FIG. 13 to the recess 1120. The illustrative right flank 1502 preferably forms a stop surface for the pin 1050 of FIG. 12 and FIG. 13 in the recess 1120 and has a comparatively steep slope. When the hook element 160 is actuated by a user, a comparatively small initial rotation of the hook element 160 by 45°, for example, is sufficient and the pin 1050 the moves automatically along the flank 1501 into the locking position 402 of FIG. 4 due to a pretensioning of the bushing 1040 by the spring element 1030.

Figure 16:
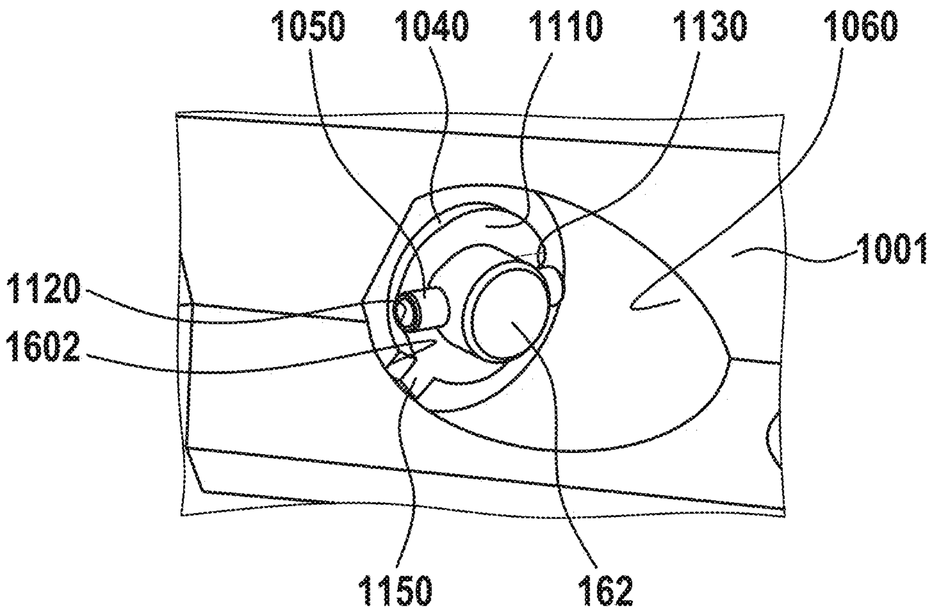

FIG. 16 shows the free end of the rotation axis portion 162 of FIG. 12 to FIG. 15 in the receptacle 1060 of the housing half-shell 1001. FIG. 16 illustrates the arrangement of the anti-rotation web 1150 of the bushing 1040 in a groove 1602 of the housing half-shell 1001. FIG. 16 also shows the arrangement of the pin 1050 in the recesses 1120, 1130.

Figure 17:
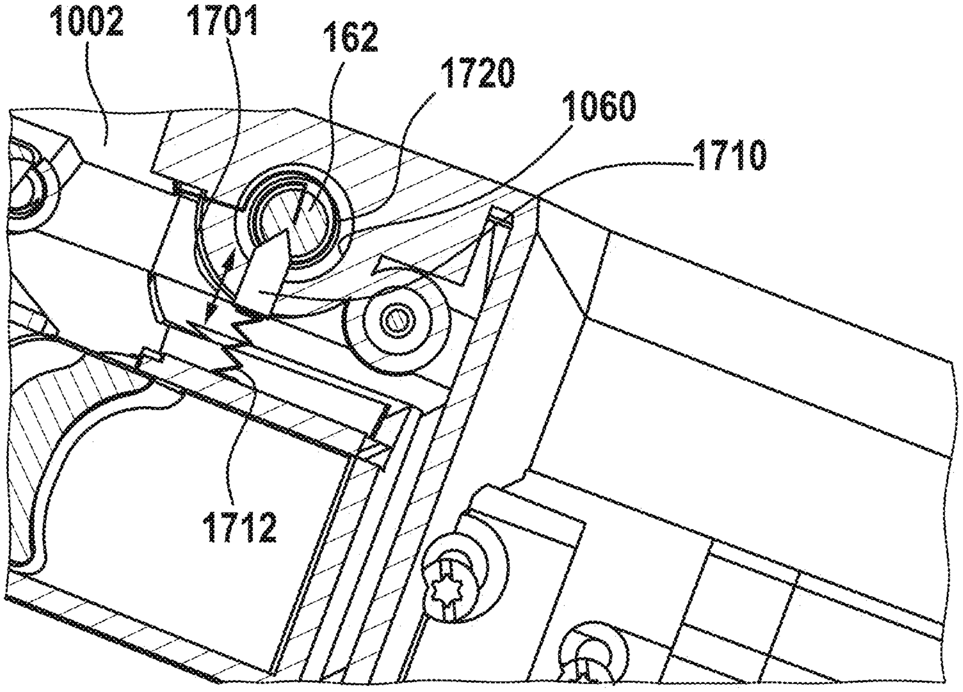

FIG. 17 shows the housing half-shell 1002 of the handle 115 and illustrates an alternative configuration of a pretensioning of the rotation axis portion 162. The rotation axis portion 162 is preferably associated with a leg spring 1720 for pretensioning, in which case it is locked into the resting position 401 of FIG. 1 via a locking pin 1710. The locking pin 1710 is pretensioned via a spring element 1712. When the rotation axis portion 162 is rotated or the locking pin 1710 is released, the rotation axis portion 162 is moved into the locking position 402 of FIG. 2 by the pretension. The locking pin 1710 preferably carries out a movement in the radial direction 1701 of the rotation axis portion 162.

What is claimed is:

1. A hand-held circular saw comprising a housing;

a drive motor disposed in the housing and configured to drive a circular saw blade;

a handle disposed on the housing;

a hanging device disposed on the handle and including (i) a rotation axis portion, and (ii) a hook element;

a bushing which is configured to lock the rotation axis portion at least in an associated locking position; and a pin configured to axially secure the rotation axis portion on the handle, wherein the pin is connected to the rotation axis portion in a rotationally fixed manner, wherein the hook element is disposed perpendicular to the rotation axis portion, wherein the rotation axis portion is configured to form an axis of rotation and is rotatably mounted on the housing, wherein the hook element is configured to pivot about the axis of rotation in an associated plane, and wherein the associated plane is aligned parallel to a center of gravity plane of the hand-held circular saw.

2. The hand-held circular saw according to claim 1, wherein:

a space is defined between the associated plane and the center of gravity plane, and the space is at most 40 mm.

3. The hand-held circular saw according to claim 1, wherein the rotation axis portion is disposed parallel to an axis of rotation of the circular saw blade.

4. The hand-held circular saw according to claim 1, wherein:

the hook element is configured to be rotated on the handle by a predetermined rotation angle, and the predetermined rotation angle ranges from 90° to 210°.

5. The hand-held circular saw according to claim 1, wherein the hook element is U-shaped or L-shaped.

6. The hand-held circular saw according to claim 1, wherein:

the hanging device is disposed on a side of the handle facing toward the circular saw blade, or the hanging device is disposed on a side of the handle facing away from the circular saw blade.

7. The hand-held circular saw according to claim 1, wherein the housing comprises a receptacle configured to receive the hook element in a resting position.

8. A hand-held circular saw, comprising:

a housing;

a drive motor disposed in the housing and configured to drive a circular saw blade;

a handle disposed on the housing;

a hanging device disposed on the handle and including (i) a rotation axis portion, and (ii) a hook element; and a bushing which is configured to lock the rotation axis portion at least in an associated locking position, wherein:

the hook element is disposed perpendicular to the rotation axis portion, the rotation axis portion is configured to form an axis of rotation and is rotatably mounted on the housing, the hook element is configured to pivot about the axis of rotation in an associated plane, the associated plane is aligned parallel to a center of gravity plane of the hand-held circular saw, the bushing includes an end face which faces a pin configured to axially secure the rotation axis portion on the handle, and the bushing further includes at least one recess in which the pin is disposed in the associated locking position.

9. The hand-held circular saw according to claim 8, wherein:

a space is defined between the associated plane and the center of gravity plane, and the space is at most 40 mm.

10. The hand-held circular saw according to claim 8, wherein the rotation axis portion is disposed parallel to an axis of rotation of the circular saw blade.

11. A hand-held circular saw, comprising:

a housing;

a drive motor disposed in the housing and configured to drive a circular saw blade;

a handle disposed on the housing; and a hanging device disposed on the handle and including (i) a rotation axis portion, and (ii) a hook element, wherein the hook element is disposed perpendicular to the rotation axis portion, wherein the rotation axis portion is configured to form an axis of rotation and is rotatably mounted on the housing, wherein the hook element is configured to pivot about the axis of rotation in an associated plane, wherein the associated plane is aligned parallel to a center of gravity plane of the hand- held circular saw, and wherein the hook element is associated with an operating element for pivoting from a resting position into a locking position.

12. The hand-held circular saw according to claim 11, further comprising a bushing which is configured to lock the rotation axis portion at least in an associated locking position.

13. The hand-held circular saw according to claim 12, further comprising:

a pin configured to axially secure the rotation axis portion on the handle, wherein the pin is connected to the rotation axis portion in a rotationally fixed manner.

14. The hand-held circular saw according to claim 13, wherein:

the bushing includes an end face which faces the pin, and the bushing further includes at least one recess in which the pin is disposed in the locking position.

15. The hand-held circular saw according to claim 11, wherein:

a space is defined between the associated plane and the center of gravity plane, and the space is at most 40 mm.

16. The hand-held circular saw according to claim 11, wherein the rotation axis portion is disposed parallel to an axis of rotation of the circular saw blade.

17. The hand-held circular saw according to claim 11, wherein:

the hook element is configured to be rotated on the handle by a predetermined rotation angle, and the predetermined rotation angle ranges from 90° to 210°.

18. The hand-held circular saw according to claim 11, wherein the hook element is U-shaped or L-shaped.

19. The hand-held circular saw according to claim 11, wherein:

the hanging device is disposed on a side of the handle facing toward the circular saw blade, or the hanging device is disposed on a side of the handle facing away from the circular saw blade.

20. The hand-held circular saw according to claim 11, wherein the housing comprises a receptacle configured to receive the hook element in the resting position.

* * * * *